Patented Dec. 1, 1931

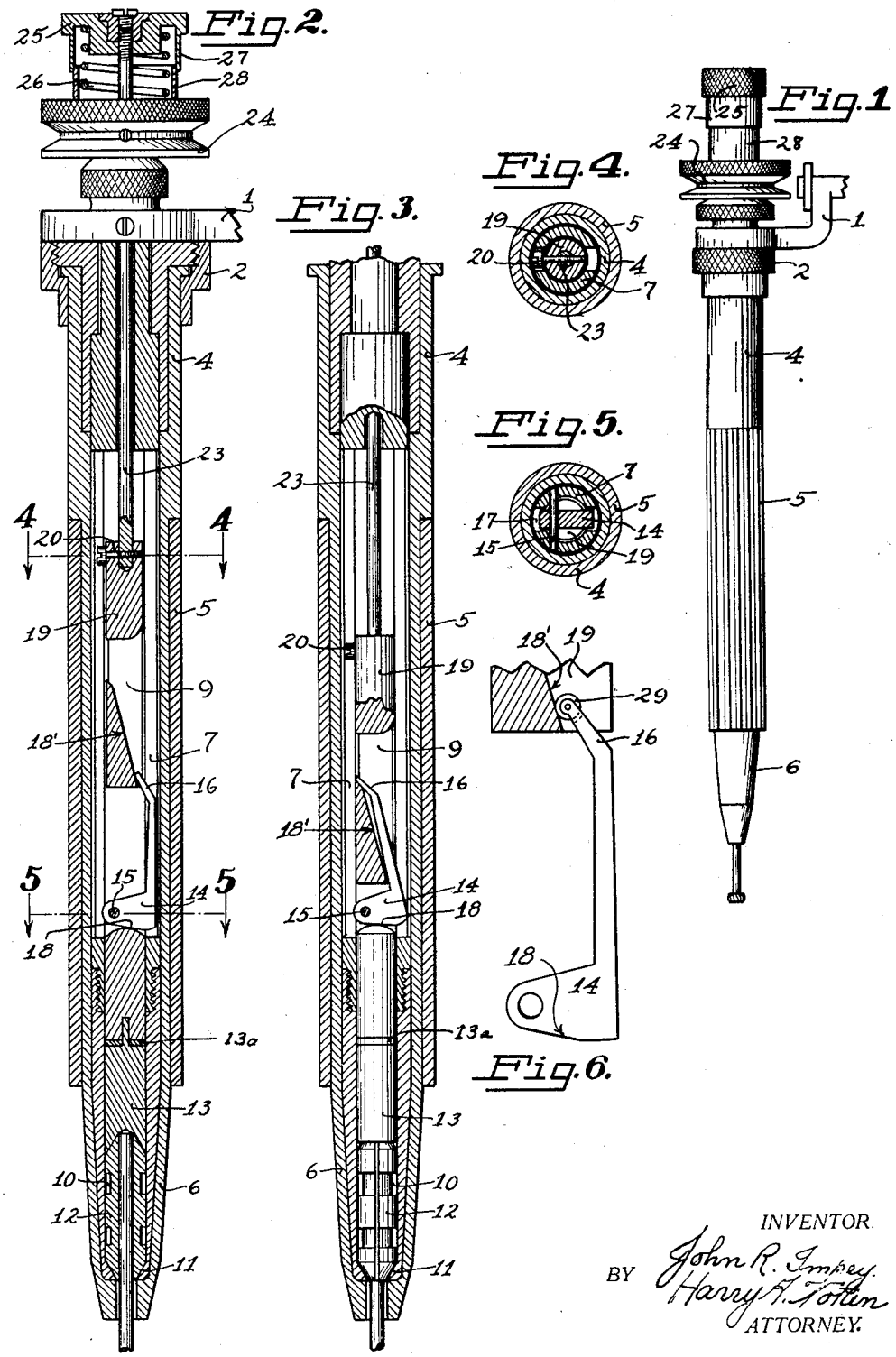

1,834,157

UNITED STATES PATENT OFFICE

JOHN R. IMPEY, OF SAN FRANCISCO, CALIFORNIA

DENTAL HANDPIECE

Application filed January 7, 1929, Serial No. 330,874. Renewed July 29, 1930.

This invention relates to improvements in dental hand pieces, and more particularly to that hand piece illustrated in my issued Patent No. 1,479,606, dated January 1st, 1924.

The present invention also relates to a single hand operated dental hand piece, whereby the dentist is enabled to grip the sheath or spindle pulley with the first and second fingers and with the thumb inwardly press the operating stem when it is desired to release an implement or burr from the chuck.

One of the objects of this invention is to simplify the interior structure of the hand piece by reducing the number of parts, making them more accessible and adjustable, and to enable the one hand piece with a sheath of fixed length to be constructed with a spring operated wedge slide coacting with a lever, which in turn operates a chuck plunger controlling the holding of the tool within the hand piece.

By my present invention, the work of changing the tools or implements used in a hand piece is materially expedited and the loss of time in sterilizing the hands between change of tools is eliminated, as the pressure of the thumb or finger of the hand holding the hand piece is all that is required to release the tool.

With the above mentioned and other objects in view, the invention consists in the novel construction and combination of parts hereinafter described, illustrated in the accompanying drawings and pointed out in the claims hereto appended: it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Fig. 1 is a view in side elevation of the preferred embodiment of my invention.

Fig. 2 is a similar view with the sheath illustrated in section, disclosing the spindle and the smooth face wedge slide and lever in chuck locking position.

Fig. 3 is a longitudinal sectional view of the spindle, illustrating the chuck plunger operating lever and the wedge slide in chuck releasing position.

Fig. 4 is a transverse section on line 4—4 Fig. 2, the parts being in the position to lock the implement stem.

Fig. 5 is a view similar to Fig. 4 taken on line 5—5 Fig. 2.

Fig. 6 is a detail view in side elevation of a modified form of lever.

In the drawings, a conventional wrist joint frame is indicated at 1, and to this is secured by a collar 2 the non-extensible tubular hand piece sheath or casing 4 of a fixed length provided with a corrugated gripping portion 5 and a tapered terminal end 6. A tubular spindle 7 is rotatable within the sheath 4, and the inner bore of the spindle is formed with the respective tubular chambers 9 and 10, the lower end of the chamber 10 being conical as at 11. Within the lower end of the spindle is mounted a chuck 12 of the well known type, and cooperating with this chuck is a chuck follower or plunger 13 lineally movable within the upper end of the chamber 10, the present plunger being illustrated as of two parts whereby to permit of the use of one or more shims 13a between the parts to compensate for wear of the plunger and associated parts as well as to afford a very fine adjustment in order to provide for the exact amount of movement of the plunger required to properly close the chuck.

To actuate the chuck plunger 13, a chuck plunger operating lever 14 is mounted within the enlarged chamber 9 in the spindle, and the same is fulcrumed at 15, the fulcrum pin extending into the walls of the slot 17. The lever is held from longitudinal movement within the chamber as it is fulcrumed to a part which is also held from longitudinal movement within the hand piece.

The butt or base 18 of the lever coacts with the end of the plunger 13, as in the drawings, and the end of said lever is offset or laterally bent at 16, to ride on the inclined or wedge surface 18' of a lever actuating block 19 slidable longitudinally within chamber 9 and attached by a pin 20 to the inner end of an operating stem 23. The stem 23 is mounted for lineal reciprocating movement through the upper end of the sheath and projects outwardly beyond the conventional spindle pulley 24, which is secured to the spindle to impart rotation thereto. The pin 20 is arranged for detachment through one of the openings in the side wall of the spindle when the sheath or casing 4 is removed, whereby to permit the operating stem 23 to be applied and withdrawn without removal of the cam block 19, and also without having to disconnect the bearing member for the rear or pulley end of the spindle.

The upper end of the operating stem carries a head 25 and surrounding the stem between said head and spindle pulley is a coiled expansion spring 26, which normally moves said stem outwardly to operate the block 19 to cause the surface 18 thereof to ride over the end of lever 14 to cause the chuck plunger to operate the chuck to tightly engage the stem of the burr or implement received therein.

It will thus be apparent that but one hand of the operator is needed for changing the implement within the hand piece, and the hand piece need not be removed from that hand of the operator which he uses in working on the patient.

Cooperating telescopic skirts 27 and 28, one carried by pulley 24 and the other extended from head 25 enclose spring 26 and conceal the same.

The hand piece is at its maximum normal overall length when spring 26 is holding block 19 to cause the smooth inclined surface 18' thereof to operate lever 14 to actuate parts to hold the tool in clutch 12. This enables a simplified construction of the sheath and a lesser number of parts than are required in devices now on the market wherein the length of the sheath is variable and is of greatest length when the tool is locked and wherein friction alone serves to hold the tool in locked position and the lever reciprocates with a part of the sheath. The sheath is of a fixed length, and if desirable an antifriction roller 29 may be mounted on the end of lever 14 to reduce friction on the operation of part or block 19.

I claim:—

1. A dental hand piece including a nonextensible sheath of a fixed length, a spindle rotatable therein, an implement holding chuck in one end of said spindle for operation to grip and release an implement, a lever pivoted within the spindle to cooperate with said chuck, a part longitudinally slidable within said spindle and relatively to the lever, said part provided with a smooth inclined surface operating on said lever on the longitudinal sliding of the part within the spindle to cause the lever to actuate the chuck, a reciprocable stem extending from the other end of said sheath and operatively connected to the longitudinally slidable part, and a spring for actuating the stem to cause said longitudinally slidable part to operate and through the lever to lock the implement within the chuck.

2. A dental hand piece comprising a casing, a spindle mounted for rotation within the casing, a tool holding chuck at the forward end of the spindle, a closing element for the chuck, an operating part for said closing element, an actuating member for said part bodily movable in engagement therewith, an operating stem for said actuating member extending through the rear end of the spindle and having a finger piece for moving it longitudinally of the spindle in one direction to effect release of said operating part, means detachably connecting the stem with said actuating member, said means being accessible through an opening formed in the wall of the spindle and spring means associated with said stem for moving it in an opposite direction whereby to maintain the chuck closing element in operative position.

3. A dental hand piece comprising a casing, a spindle mounted for rotation within the casing, a tool holding chuck at the forward end of the spindle, a part movable within the spindle for operating the chuck, a second part slidably mounted within the spindle in engagement with the first mentioned part and cooperating therewith when in a predetermined position to maintain the chuck closed, said second part having an operating portion extending through the rear end of the spindle, spring means associated with said operating portion for holding said second part in said predetermined position and a telescoping housing for said spring means carried by said operating portion.

4. A dental hand piece comprising a nonextensible sheath of a fixed length, a spindle rotatable therein, an implement holding chuck in one end of said spindle for operation to grip and release an implement, a part pivoted within the spindle to cooperate with said chuck, a second part longitudinally slidable within said spindle and relatively to said first part, one of said parts having a smooth inclined surface engaging the other of said parts whereby operation of said slidable part within the spindle will cause the pivoted part to actuate the chuck, a reciprocable stem extending from said sheath and operatively connected with the longitudinally slidable part, and a spring for actuating the stem in one direction to cause said longitudinally slidable part to operate said pivoted part.

5. A dental hand piece comprising a casing, a spindle mounted for rotation within the casing, a driving pulley on the spindle, a tool holding chuck in the forward end of the spindle, a part movable within the spindle for operating the chuck, a second part slidably mounted within the spindle in engagement with the first mentioned part and cooperating therewith when in a predetermined position to maintain the chuck closed, said second part having an operating extension projecting through the pulley, a housing comprising telescoping sections one on the extension and the other on the pulley, and a spring within the housing between the pulley and the first mentioned housing section, said spring operating to hold said second part in said predetermined position.

In testimony whereof I have signed my name to this specification.

JOHN R. IMPEY.